United States Patent
Baba

(10) Patent No.: US 6,615,022 B1
(45) Date of Patent: Sep. 2, 2003

(54) IMPULSE NOISE REJECTION CIRCUIT AND SATELLITE COMMUNICATIONS TERMINAL USING THE SAME

(75) Inventor: Masanori Baba, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 603 days.

(21) Appl. No.: 09/624,119

(22) Filed: Jul. 24, 2000

(30) Foreign Application Priority Data

Jul. 26, 1999 (JP) ............................................ 11-210455

(51) Int. Cl.$^7$ .............................. H04B 7/185; H04B 1/10
(52) U.S. Cl. ...................... 455/12.1; 455/307; 455/308; 455/501; 375/350
(58) Field of Search .............................. 455/12.1, 427, 455/501, 67.11, 67.13, 218, 222, 223, 226.1, 232.1, 296, 307, 308; 375/345, 346, 350

(56) References Cited

U.S. PATENT DOCUMENTS

| | | | | |
|---|---|---|---|---|
| 4,203,072 A | * | 5/1980 | Beningfield et al. | ........ 455/223 |
| 5,805,241 A | * | 9/1998 | Limberg | ...................... 375/346 |
| 6,385,261 B1 | * | 5/2002 | Tsuji et al. | .................. 375/346 |
| 6,459,727 B1 | * | 10/2002 | Cho et al. | .................... 375/350 |

* cited by examiner

*Primary Examiner*—Quochien Vuong
(74) *Attorney, Agent, or Firm*—RatnerPrestia

(57) ABSTRACT

The disclosed impulse noise rejection circuit and satellite communications terminal using the same are small in circuitry and small in the number of components. The limiter amplifier disposed before a narrow band pass filter controls a desired reception signal and an impulse noise to the same amplitude. The suppression of the amplitude of the impulse noise eliminates the effect of extension of fall time of the impulse noise, which is caused by a time constant of the narrow band pass filter, on the desired reception signal. Thus it realizes the impulse noise rejection circuit small in circuitry and small in the number of parts, and the satellite communications terminal using the same.

16 Claims, 3 Drawing Sheets

IMPULSE NOISE REJECTION CIRCUIT AND SATELLITE COMMUNICATIONS TERMINAL USING THE SAME

FIELD OF THE INVENTION

The present invention relates to a receiving circuit of a wireless device such as satellite communications terminal.

BACKGROUND OF THE INVENTION

Recently, owing to the development of satellite communications and cellular telephones, interference signals are increasing for reception of a wireless device.

Besides, in the personal computers and other household appliances, there are many devices using clocks of hundreds of megahertz, and a clock noise from them is also an interference for the receivers.

Interference waves outside of the band of desired signal can be removed by using filter characteristics. However, a filter cannot remove an impulse noise in the band of desired signal. In the present environments of electromagnetic waves, such a noise is occurring more and more frequently. Ignition noises of engine, or contact noises of a railcar and a cable is a momentary wide-band noise. Recently, as two-way communications systems using low earth orbit satellites, various systems are introduced, including Orbcomm, Globalstar and Iridium. Everywhere in the terminal bands used in such communications systems, there are sources of impulse noises of such frequency components.

In the case of Orbcomm, for example, a very high frequency (VHF) band is used for the downlink. Therefore, if there is such an impulse noise or its harmonic component in the VHF band, it gets into the band of the receiving terminal. As a result, such an impulse noise has a serious effect on the downlink reception from the satellite.

That is, an impulse noise of high level or its harmonic component becomes a serious interference signal when getting into the band of downlink from the satellite.

Suppose an interference signal of a larger electric power than a desired signal is present in the receiving band of the desired signal for a long period. At this time, as long as the interference signal exists, the desired signal is masked by the interference signal. It is therefore impossible to pick up the desired signal, and the reception-disabled state continues.

The interference signal existing for a long time at a specific frequency is mostly permitted and generated for a specific purpose. Therefore, the district under the influence is limited. In such a case, the effect can be avoided by using the receiver outside of the specific district under the influence of the interference signal.

However, an impulse noise with a shorter pulse width than a symbol period of the data stream in the desired signal may be present everywhere as mentioned above. Therefore, the receiver is required to have a circuit for rejecting an interference by such an impulse noise. Referring now to the drawing, a conventional impulse noise rejection circuit is explained below.

FIG. 4 is a structural diagram of a conventional impulse noise rejection circuit.

In FIG. 4, the impulse noise rejection circuit comprises a switch 32 for cutting off the signal line, an amplifier 33 for amplifying the impulse noise, a detector 34 for detecting the impulse noise, a control signal generator 35 for opening and closing the signal line, and a narrow band pass filter 36.

In the conventional impulse noise rejection circuit having such a configuration, the operation is explained below.

In FIG. 4, the impulse noise getting into the receiving circuit enters the input signal line 31 and impulse noise amplifier 33. In the amplifier 33, the impulse noise is amplified to a level so as to be detected by the detector 34. In the detector 34, the envelope of the impulse is taken out by envelope detection, and is passed through two low pass filters differing in the time constant. If a signal having a steep rise such as an impulse noise is fed into the detector, a potential difference occurs in the outputs of the two low pass filters. This potential difference is detected in the controller 35. When the controller 35 detects a potential difference larger than a specified value, the controller 35 generates a signal for releasing the switch 32. Thus, by the input of impulse noise, the input signal line 31 is cut off. Therefore, the impulse noise is not transmitted to the narrow band pass filter 36. In this manner, effects of impulse noise on reception can be suppressed.

Such a conventional structure, however, requires many components and is large in the circuitry.

SUMMARY OF THE INVENTION

It is hence an object of the invention to solve the problems of the prior art and present an impulse noise rejection circuit smaller in the circuitry and reduced in the number of parts.

To solve the problems, the invention employs a limiter amplifier for equalizing the level between the impulse noise and ordinary signal. Thus, an impulse noise rejection circuit smaller in the circuitry and reduced in the number of components is presented.

Further, the invention employs an automatic gain control amplifier for equalizing the level between the impulse noise and ordinary signal. In this structure, too, an impulse noise rejection circuit smaller in the circuitry and reduced in the number of parts is presented.

DESCRIPTION OF THE PREFERRED EMBODIMENTS

Figure 1:
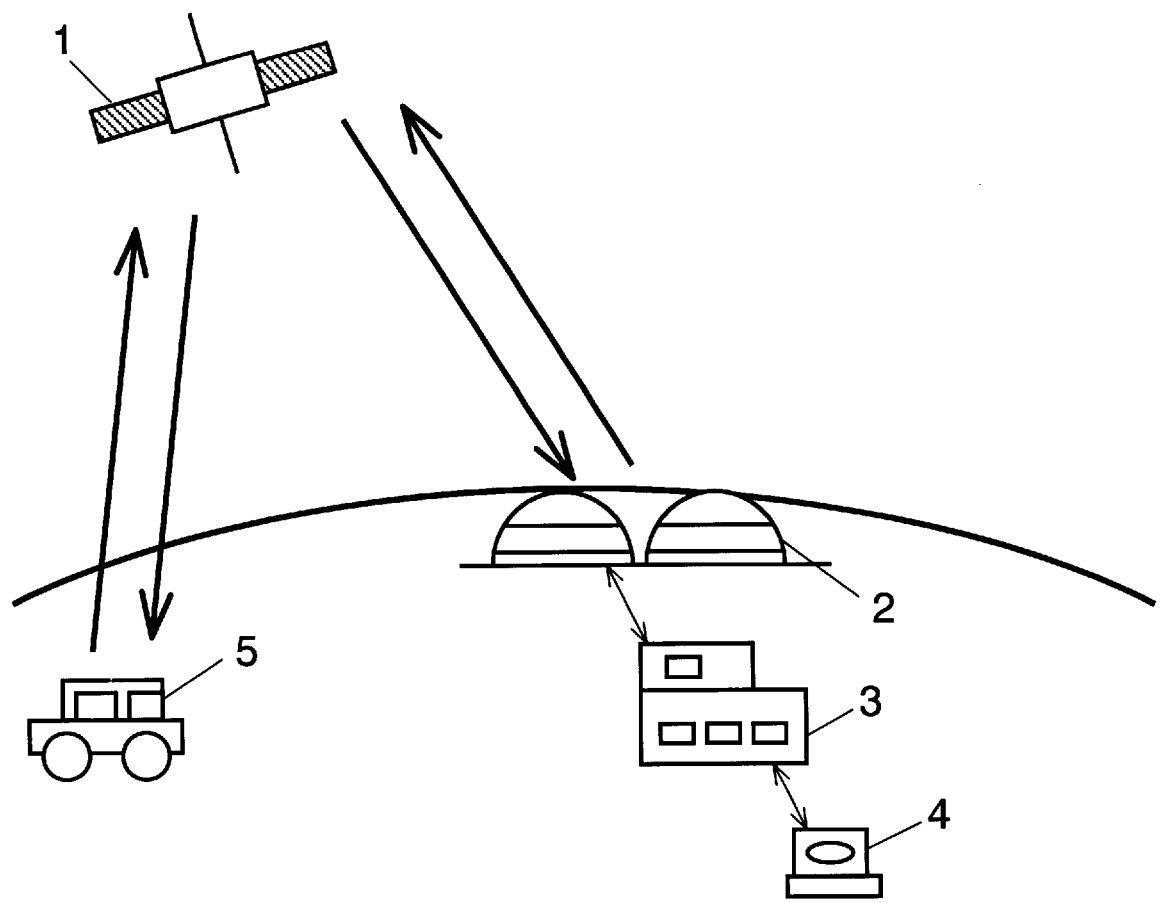
FIG. 1 is a schematic diagram of communications satellite system in embodiment 1 of the invention.

Referring now to the drawings, preferred embodiments of the invention are described in detail below.

Embodiment 1

The communications satellite system in FIG. 1 shows a communications satellite 1, Gateway Earth Station 2, Network Control Center 3, a control terminal 4, and a transmission-reception terminal 5. Network Control Center 3 is connected to Gateway Earth Station 2 by way of a terrestrial communication network such as a public telephone network. The control terminal 4 is connected to Network Control Center 3 by way of a terrestrial communication network such as a public telephone network. The transmission-reception terminal 5 is disposed aboard a mobile unit such as an automobile or a ship.

The mobile unit has a Global Positioning System (GPS) receiver not shown in the drawing. By the satellite wave from the GPS satellite, the present position of the mobile unit is calculated, and the present position data is transferred to the transmission-reception terminal 5. The transmission-reception terminal 5 transmits this present position data to the communications satellite 1. The transmission signal is received at Gateway Earth station 2 through the communications satellite 1, and is fed into Network Control Center 3 through the terrestrial communication network. The control terminal 4 accesses Network Control Center 3 by using the terrestrial communication network, and acquires the present position information of the mobile unit.

Similarly, the control terminal 4 can acquire the present position information of plural mobile units by the same operation.

Further, the control terminal 4 acquires the present position information of plural mobile units, and presents the instruction information of, for example, the destination to these mobile units. The instruction information is transmitted to Gateway Earth Station 2 through the terrestrial communication network, and is sent to the transmission-reception terminal 5 installed in the mobile unit by way of the communications satellite 1, so that the instruction information to the mobile unit is transmitted.

The communications satellites offering such a service include Orbcomm, Globalstar, and Iridium, among others.

The impulse noise rejection circuit of the invention is applied in the receiving apparatus in such a communications satellite system, and eliminates the effects of shorter impulse noise than the symbol period of the data stream on the receiving circuit in such communications systems.

Figure 2:
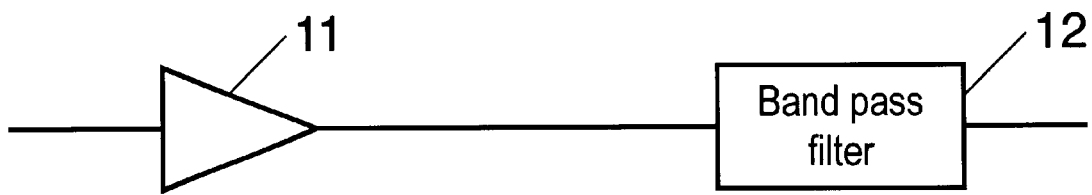
FIG. 2 is a structural diagram of impulse noise rejection circuit in embodiment 1 of the invention.

The impulse noise rejection circuit in FIG. 2 comprises a limiter amplifier 11 and a narrow band pass filter 12. This impulse noise rejection circuit is inserted in an intermediate frequency amplifier of the receiving apparatus. It is also possible to insert this impulse noise rejection circuit in the high frequency amplifier in the receiver or in a circuit of other stages.

In the impulse noise rejection circuit having such a structure, the operation is described below.

The pulse width of an impulse noise is shorter than the symbol period of the data stream in the desired signal. On the other hand, the amplitude of the impulse noise may become an interference signal larger than the amplitude of desired signal by several tens of dB in the band of desired signal. In this case, the frequency component of impulse noise is in the same frequency band as the carrier of desired signal, and is at a higher level than the desired signal. Therefore the desired signal may not be detected while the noise is existing. However, this noise existing time is shorter than the symbol period of the data stream of the desired signal. Therefore, unless this noise coincides with the state changing timing of data signal in the desired signal, theoretically, no adverse effect is given to the reception.

The effect of impulse noise increases due to the following reason.

Assuming that an impulse noise is input into the narrow band pass filter for rejecting the interference signal outside of the occupied band of desired signal, since the time constant of the band pass filter is large, the fall time of the impulse is extended by the band pass filter. Accordingly, the interference time of the impulse continues for a long time. Thus there is the higher probability that the impulse overlaps with the state changing point of desired signal.

The desired signal is lower in level than the impulse noise. Therefore, the effect of noise remains until the level of the impulse noise extended in the fall time by the narrow band pass filter becomes sufficiently smaller than the level of desired signal.

In this embodiment, the limiter amplifier 11 is placed before the narrow band pass filter 12 in FIG. 2. By the limiter amplifier 11, the amplitude of the impulse noise is suppressed to the same amplitude as that of the desired signal. The desired signal directly passes through the narrow band pass filter 12.

On the other hand, the time width of impulse noise is far smaller than the symbol period of the data stream in the desired signal, and its amplitude is the same as that of desired signal. Therefore, if it takes time in fall of an impulse noise due to the narrow band pass filter, as compared with the data transmission period of the desired signal, the time is far shorter. Hence, effects of impulse noise can be decreased.

Thus, according to the embodiment, effects of impulse noise can be alleviated in a small circuitry.

Embodiment 2

In embodiment 2, the applicable communications system is the same as in embodiment 1, and its explanation is omitted.

In this embodiment, too, the amplitude of impulse noise is suppressed to the same amplitude of desired signal, and effects of impulse noise are lessened.

Figure 3:
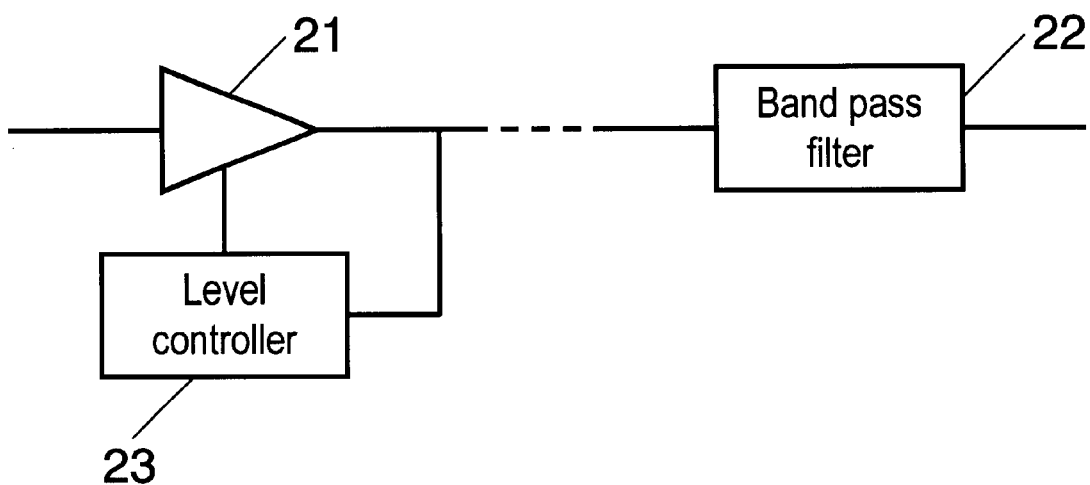
FIG. 3 is a structural diagram of impulse noise rejection circuit in embodiment 2 of the invention.
Figure 4:
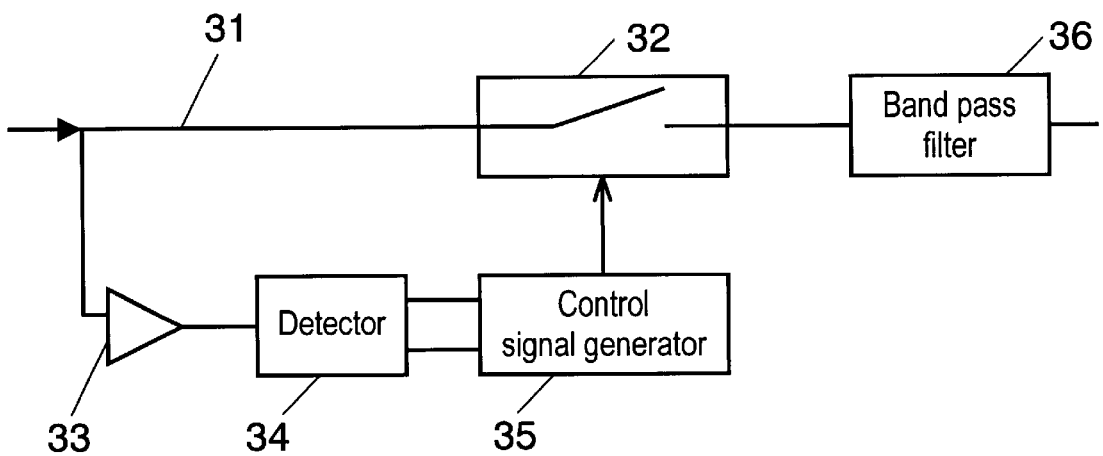
FIG. 4 is a structural diagram of a conventional impulse noise rejection circuit.

An impulse noise rejection circuit in FIG. 3 comprises an automatic gain control (AGC) amplifier 21, a narrow band pass filter 22, and a level controller 23.

In the impulse noise rejection circuit having such a structure, the operation is described below.

In this impulse noise rejection circuit, the AGC amplifier 21 is disposed before the narrow band pass filter 22 in FIG. 3. A portion of the signal amplified by the AGC amplifier 21 gets into the level controller 23, and the AGC amplifier 21 is controlled so that this input level may be constant. By the AGC amplifier 21 and level controller 23, the amplitude of the impulse noise and amplitude of the desired signal become equal to each other. The desired signal directly passes through the narrow band pass filter 22. On the other hand, in the same way as explained in embodiment 1, the time width of the impulse noise is far smaller than the symbol period of the data stream in the desired signal, and its amplitude is the same as the amplitude of the desired signal. Therefore, if it takes time in fall of an impulse noise due to the narrow band pass filter, as compared with the symbol period of the data stream in the desired signal, the time is far shorter.

The impulse noise rejection circuit of the embodiment is also inserted in the intermediate frequency amplifier of the receiving apparatus. The impulse noise rejection circuit can be also inserted in the high frequency amplifier of the receiver or in a circuit of other stages.

Thus, in this embodiment, too, effects of impulse noise can be suppressed in a small circuitry.

As described herein, according to the invention, effects of impulse noise can be suppressed in a small circuitry, at a satellite communications terminal, in the following configuration.

1) a limiter amplifier is disposed before the narrow band pass filter.

2) an AGC amplifier and a level controller are disposed before the narrow band pass filter.

What is claimed is:

1. An impulse noise rejection circuit used in a receiving circuit of a wireless communications apparatus, comprising:

an amplifier for amplifying a received impulse noise and a reception signal substantially to a same amplitude to output, and a narrow band pass filter for receiving output signals from said amplifier, and outputting a signal limited in band.

2. The impulse noise rejection circuit of claim 1, wherein said narrow band pass filter eliminates effects of the impulse noise on the reception signal, by making use of the phenomenon that the impulse noise having substantially the same amplitude as the reception signal attenuates according to the time constant of said narrow band pass filter.

3. The impulse noise rejection circuit of claim 1, wherein said narrow band pass filter eliminates an interference signal outside of the band of the reception signal.

4. The impulse noise rejection circuit of claim 2, wherein said narrow band pass filter eliminates an interference signal outside of the band of the reception signal.

5. The impulse noise rejection circuit of claim 1, wherein said amplifier is a limiter amplifier.

6. The impulse noise rejection circuit of claim 2, wherein said amplifier is a limiter amplifier.

7. The impulse noise rejection circuit of claim 1, wherein said amplifier is an automatic gain control amplifier.

8. The impulse noise rejection circuit of claim 2, wherein said amplifier is an automatic gain control amplifier.

9. A satellite communications terminal comprising:

an amplifier for amplifying an impulse noise and a reception signal substantially to a same amplitude, and a narrow band pass filter for receiving output signals from said amplifier, eliminating an interference signal outside of the band of the reception signal and outputting a resultant signal.

10. The satellite communications terminal of claim 9, wherein said narrow band pass filter eliminates effects of the impulse noise on the reception signal, by making use of the phenomenon that the impulse noise having substantially the same amplitude as the reception signal attenuates according to the time constant of said narrow band pass filter.

11. The satellite communications terminal of claim 9, wherein said narrow band pass filter eliminates a interference signal outside of the band of the reception signal.

12. The satellite communications terminal of claim 10, wherein said narrow band pass filter eliminates a interference signal outside of the band of the reception signal.

13. The satellite communications terminal of claim 9, wherein said amplifier is a limiter amplifier.

14. The satellite communications terminal of claim 10, wherein said amplifier is a limiter amplifier.

15. The satellite communications terminal of claim 9, wherein said amplifier is an automatic gain control amplifier.

16. The satellite communications terminal of claim 10, wherein said amplifier is an automatic gain control amplifier.

* * * * *